US008738831B2

(12) United States Patent
Vecera et al.

(10) Patent No.: US 8,738,831 B2
(45) Date of Patent: May 27, 2014

(54) INTEGRATING UNIVERSAL SERIAL BUS DEVICES TO A COMPUTER SYSTEM

(75) Inventors: Martin Vecera, Brno (CZ); Jiri Pechanec, Mokra-Horakov (CZ)

(73) Assignee: Red Hat, Inc., Raleigh, NC (US)

(*) Notice: Subject to any disclaimer, the term of this patent is extended or adjusted under 35 U.S.C. 154(b) by 155 days.

(21) Appl. No.: 13/306,272

(22) Filed: Nov. 29, 2011

(65) Prior Publication Data

US 2013/0138859 A1 May 30, 2013

(51) Int. Cl.
*H05K 7/10* (2006.01)
*G06F 13/40* (2006.01)

(52) U.S. Cl.
CPC .................. *G06F 13/409* (2013.01)
USPC ........................................ 710/301

(58) Field of Classification Search
USPC .............. 710/300–319, 104–110, 8–19, 1–2, 710/62–64, 72–74; 719/321
See application file for complete search history.

(56) References Cited

U.S. PATENT DOCUMENTS

| 6,824,064 | B2* | 11/2004 | Guthery et al. | 235/492 |
| 7,631,124 | B2* | 12/2009 | Lockhart et al. | 710/62 |
| 8,086,764 | B2* | 12/2011 | Kondo | 710/18 |
| 8,171,502 | B2* | 5/2012 | Mullis et al. | 719/321 |
| 2004/0205778 | A1* | 10/2004 | Wong et al. | 719/321 |
| 2005/0278461 | A1* | 12/2005 | Ohta | 710/8 |
| 2008/0147375 | A1* | 6/2008 | Siren et al. | 703/24 |
| 2010/0037224 | A1* | 2/2010 | Hosoda | 718/100 |
| 2010/0235550 | A1* | 9/2010 | Bolton et al. | 710/62 |
| 2011/0219159 | A1* | 9/2011 | Park | 710/300 |
| 2012/0124247 | A1* | 5/2012 | Hanson et al. | 710/16 |
| 2012/0144083 | A1* | 6/2012 | Hassan et al. | 710/303 |

* cited by examiner

*Primary Examiner* — Raymond Phan
(74) *Attorney, Agent, or Firm* — Lowenstein Sandler LLP

(57) ABSTRACT

A mechanism for integrating Universal Serial Bus (USB) devices is disclosed. A method of the invention includes retrieving an identifier of the USB device connected to a computer system, matching the identifier with a device identification stored in a systems library of the computer system. The systems library includes an application identifier corresponding to the device identification and an attribute corresponding to the application identifier. The method also includes executing instructions associated with attribute corresponding to the application identifier associated with the device identification matched to the identifier.

20 Claims, 4 Drawing Sheets

INTEGRATING UNIVERSAL SERIAL BUS DEVICES TO A COMPUTER SYSTEM

TECHNICAL FIELD

The embodiments of the invention relate generally to a computer system and, more specifically, relate to systems and methods for integrating universal serial bus (USB) devices in a computing environment.

BACKGROUND

When a new device is connected to a computer system, it requires installation of a special application on the computer to ease interaction with the new device. Some examples of such devices are MP3 players, digital cameras, and mobile phones. The installed applications associated with the devices may, for example, organize music, import photos, and so on.

Once the applications are installed and started, they generally sit active in the system tray and wait for their associated device to be connected to the computer system. As a result, the applications are running in a loop in the background, which can take up enormous amounts of system resources, such as memory and Central Processing Unit (CPU) load and time. Thus, the more devices that are connected to a computer system, the more applications consume system resources, leaving fewer resources for other important applications. Moreover, it is not necessary to have these applications running (even in the background) because the device is generally connected to the system for a short time.

Conventional solutions to the above-described problem include data synchronization applications, such as Microsoft ActiveSync, which enable a computer system to synchronize the handheld devices. Typical problems with such synchronization applications is that they proactively search for connected devices and run other processes that are known to have a negative impact on a computer's performance. Furthermore, when not in use, these synchronization applications still can consume CPU load and time.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
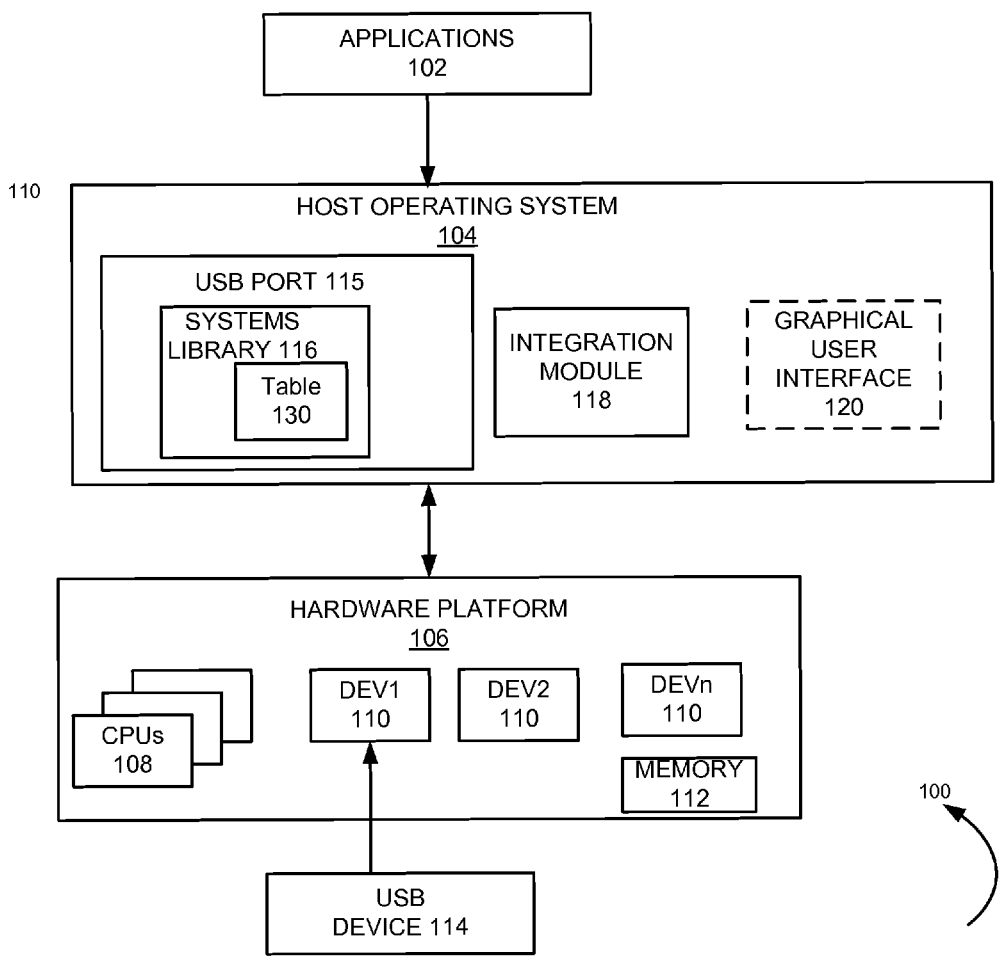
FIG. 1 is a block diagram of a computer system in which the embodiments of the present invention may operate.

Embodiments of the invention provide for mechanism for integrating USB devices. A method of embodiments of the invention includes retrieving an identifier of the USB device connected to a computer system, matching the identifier with a device identification stored in a systems library of the computer system. The systems library includes an application identifier corresponding to the device identification and an attribute corresponding to the application identifier. The method also includes executing instructions associated with the attribute corresponding to application identifier associated with the device identification matched to the identifier.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "determining", "computing", "performing", "matching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide systems and methods for integrating universal serial bus (USB) devices in a computing environment. An integration module is initialized on a host operation system. The integration module reads and/or retrieves an identifier (ID) of the USB device connected to the computer. The integration module functions to match the USB device ID with one or more IDs found in a list of device IDs stored in the systems library of the OS, and then executes the application(s) associated with the device ID. In one embodiment, the integration module executes all the applications associated with the device ID. In another embodiment, the integration module executes the applications that include attributes having instructions to execute the application upon the device being connected to the computer. In a further embodiment, the integration module prompts a user to select the applications to execute.

FIG. 1 is a block diagram illustrating one embodiment of a computer system 100, in which embodiments of the present invention may be implemented. The computer system 100 may be a host machine such as, for example, a server computer, a gateway computer or any other suitable computer system that is configurable for operating as a host. The host machine (also referred to as a host computer system) 100 comprises a host operating system 104 (i.e., a host OS 104) on which runs one or more software application programs 102 (i.e., applications 102) and a hardware platform 106. Operating system 104 may include Microsoft Windows™, Linux™, Solaris™, Mac™ OS or any other suitable operating system for managing operations on the computer system 100.

The hardware platform 106 may include one or more central processing units (CPUs) 108, devices 110 and a memory 112. The devices 110 may be comprised of one or more hardware and software devices 110, which may be located internally and/or externally to the host 100. Examples of the devices 110 include, but are not limited to, network interface cards (NICs), sound or video adaptors, photo/video cameras, printer devices, keyboards, displays, a USB host controller (e.g., DEV 1), or any other suitable device intended to be coupled to a computer system. Examples of the memory 112 include random-access memory (RAM), non-volatile storage memory (e.g., Flash, EEPROM, solid state drives (SSD), etc.), magnetic storage memory (e.g., one or more hard drives), optical memory (e.g., CDs, DVD, BlueRay drives, etc.), network interface cards (NICs), sound or video adaptors, photo/video cameras, printer devices, keyboards, displays or any other suitable device intended to be coupled to a computer system.

In one embodiment, one or more USB device(s) 114 may be externally connectable to the operating system 104 via a USB host controller (e.g., DEV 1) integrated with the computer system 100. In an embodiment, the USB host controller may be an integrated circuit (IC) separate from the one or more CPUs 108. In another embodiment, the USB host controller may be integrated with the one or more CPUs 108. As known to one skilled in the art, USB devices are removable storage devices which can be connected to any computer system with a USB port and are available to a user in the same manner that fixed disks are made available. When connected to the system, the user can navigate the file systems on the removable storage device using the same interface as is available for fixed disks.

According to embodiments of the present invention, a systems library 116 is integrated in a USB port 115 of the operating system 104. According to embodiments of the present invention, the systems library 116 is comprised of one or more hardware and software devices, which may be located internally and/or externally to computer system 100. The systems library 116 includes a list of identifications (e.g., Device IDs) of the USB devices registered with the computer system 100. In one embodiment, the systems library 116 includes a table 130 to provide the list of Device IDs of the USB device.

The operating system 104 further includes an integration module 118 to read and/or retrieve an identifier (ID) of the USB device 114 connected to a computer. In one embodiment, this ID is unique to each of the USB devices 114. In some embodiments, the ID may represent a product and/or a vendor ID of the USB device. The integration module 118 also searches and matches this ID with the list of Device IDs in the systems library 116.

In some embodiments, the integration module 118 may further execute one or more applications associated with the Device ID of the USB device 114. The operating system 104 may also include a graphical user interface 120 to provide a user with an interface to select one or more applications identifiers (App IDs) corresponding to the one or more applications in order to run these applications for the USB device.

Figure 2:
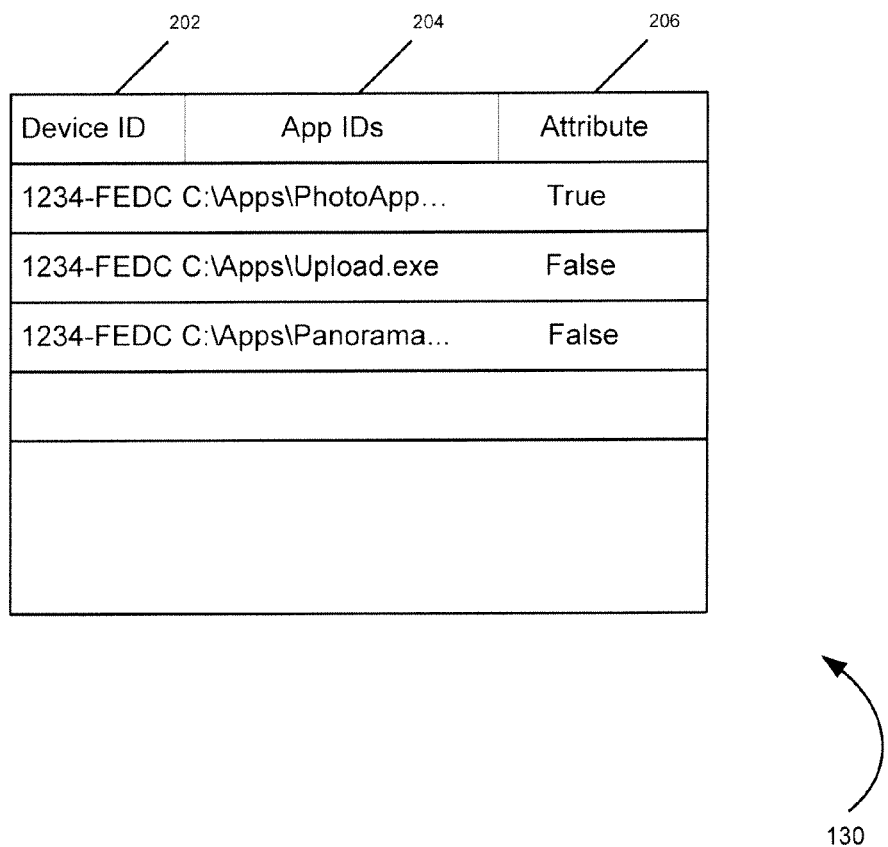
FIG. 2 illustrates an exemplary table of a systems library of a computer system according to an embodiment of the invention.

FIG. 2 illustrates an exemplary table 130 found in the system library 116 of an operating system according to an embodiments of the invention. In one embodiment, table 130 is part of systems library 116 of OS 104 described with respect to FIG. 1. In one embodiment, table 130 includes columns having a Device ID 202 unique to a USB device (such as USB device 114 of FIG. 1), one or more application identifiers (App IDs) 204 associated with the Device ID 202, and at least one attribute 206 corresponding to the one or more App IDs 204 of the Device ID 202.

In one embodiment, the Device ID 202 provides an address of the USB device 114. For example, the Device ID 202 may include, but is not limited to, an eight character ID "1234-FEDC". In one embodiment, the App IDs 204 provides application addresses. Some examples of the App IDs 204 include, but are not limited to, "C:\Apps\PhotoApp . . . ", "C:\Apps\Upload.exe . . . ", and "C:\Apps\Panaroma . . . ". In some embodiments, other different types of App IDs may be used.

In some embodiments, the attribute 206 column of table 130 may include a value representing "True" or "False". In one embodiment, "true" indicates the existence of instructions to automatically execute an application associated with the App IDs 204 upon connection of the USB device having device ID 202 with the system 100. Similarly, "false" indicates the existence of instructions to present an option to the user to select the App IDs 204 in order to execute an application associated with the selected App ID 204 upon connection of the USB device having the device ID 202.

Figure 3:
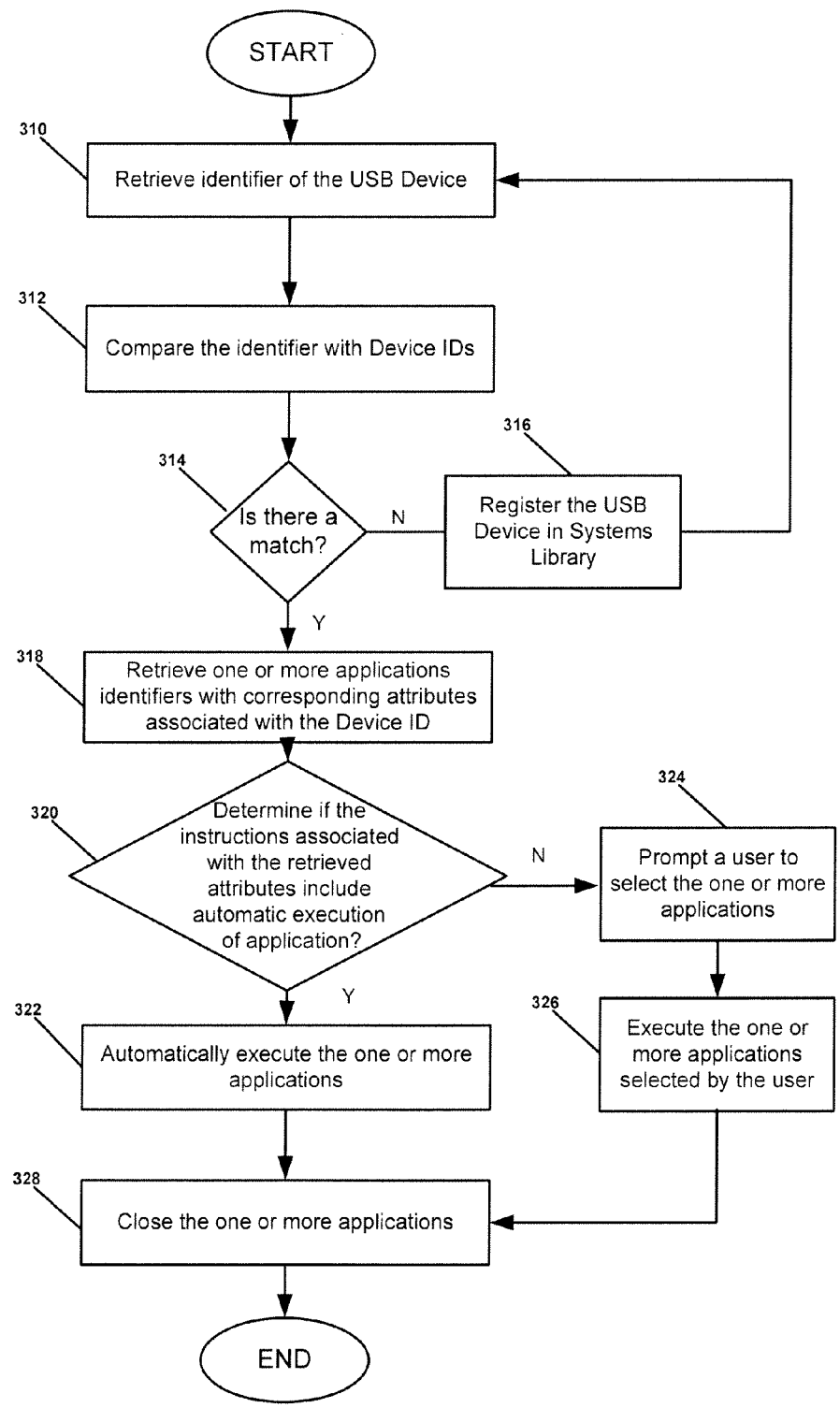
FIG. 3 is a flow diagram of one embodiment of a method for integrating a universal serial bus (USB) device in a computing environment.

FIG. 3 is a flow diagram illustrating a method 300 for integrating USB devices according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by the integration module 118 of FIG. 1.

Method 300 begins at block 310 an identifier of the USB device 114 is retrieved upon connection to the computer. As discussed above, the identifier is unique to each USB device. In one embodiment, the identifier may be part of initial information obtained from the USB device when the computer system starts communicating with the USB device. At block 312, the identifier of the USB device is compared to a list of Device IDs registered in the systems library of the OS of the computer system.

Then, at block 314, it is determined if there is a match between the identifier of the USB device and the Device IDs in the systems library. If it is determined that there is no match at block 314, the USB device is registered with the systems library at block 316. In one embodiment, the integration module includes an application programming interface (API) that automatically executes an application to directly register the USB device into the systems library 316. In another embodiment, a user is directed to register the USB device via the GUI 120. Then, method 300 returns to block 310 to continue retrieving USB device identifiers. On the other hand, if it is determined that there is a match at block 314, one or more App IDs and the corresponding attributes associated with the matched Device ID are retrieved at block 318. Subsequently, at block 320, it is determined if the instructions associated with the retrieved attributes of the retrieved App IDs include to execute the application or not. If the retrieved attribute indicates the existence of automatic execution instructions, then at block 322, the one or more applications are automatically executed.

On the other hand, if the retrieved attributes to do not indicate the existence of automatic execution instructions, then at block 324, the user is prompted to select the App ID among the list of App IDs 204. In one embodiment, a dialog window including the one or more App IDs with the corresponding attributes is provided to the user via the GUI 120. Then, at block 326, applications associated with the App IDs selected by the user at block 324 are executed.

Subsequently, at block 328, all applications that were previously executed as part of method 300 are closed. In one embodiment, the one or more applications are automatically closed after running the one or more applications. The applications are automatically closed after completion of one or more tasks executed by the one or more applications. In another embodiment, the user is prompted to close the one or more applications after running the one or more applications. In another embodiment, the one or more applications are closed after the USB device 114 is disconnected from the computer. In a further embodiment, the user is prompted to close the one or more applications after the USB device 114 is disconnected from the computer. One skilled in the art will appreciate that method 300 may be repeated for any USB device upon connection to the computer system.

Figure 4:
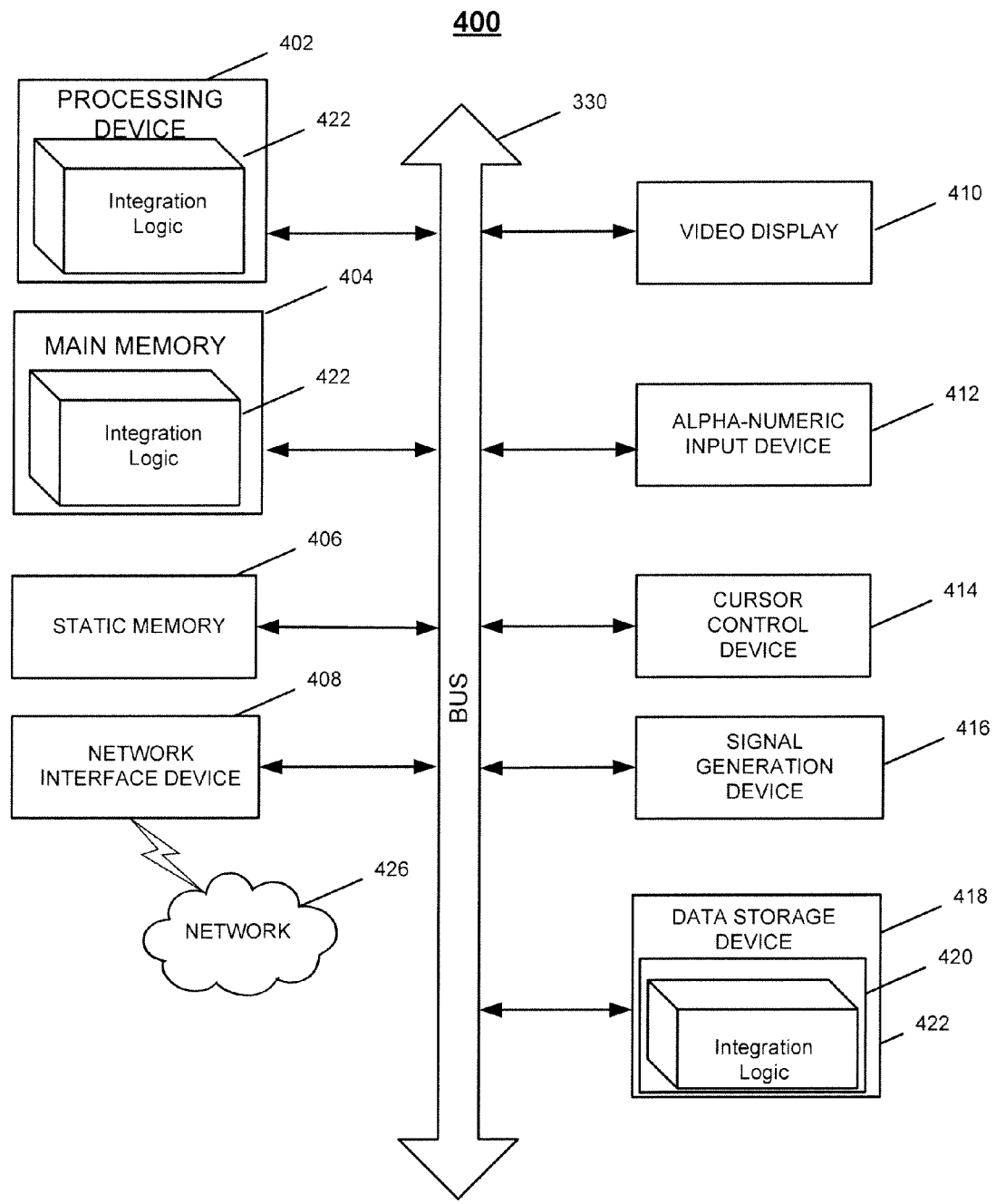
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 416, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute integration logic 422 for performing the operations and steps discussed herein, such as method 300 for integration of USB devices as described with respect to FIG. 3. In one embodiment, integration logic is performed by integration module 118 of FIG. 1.

The computer system 400 may further include a network interface device 408. The computer system 300 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium (or more specifically a computer-readable storage medium) 420 on which is stored one or more sets of instructions (e.g. integration module logic 422) embodying any one or more of the methodologies of functions described herein, such as method 300 for integration of USB devices as described with respect to FIG. 3. The integration module logic 422 may also reside, completely or at least partially, within the main memory 404 and/or within the processing device 402 during execution thereof by the computer system 400; the main memory 404 and the processing device 402 also constituting machine-accessible storage media.

The machine-readable storage medium 420 may also be used to store the integration module logic 422 persistently containing methods that call the above applications. While the machine-accessible storage medium 420 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:
    retrieving an identifier of a Universal Serial Bus (USB) device connected to a computer system;
    matching the identifier with a device identification stored in a systems library of the computer system, wherein the systems library comprises an application identifier corresponding to the device identification and an attribute corresponding to the application identifier; and
    executing, by a processing device, instructions associated with the attribute corresponding to the application identifier associated with the device identification matched to the identifier.

2. The method of claim 1 wherein the instructions comprise automatically executing one or more applications associated with the application identifier upon connection of the USB device to the computer.

3. The method of claim 1 wherein the instructions comprise prompting a user to select one or more applications associated with the application identifier for execution.

4. The method of claim 3 further comprising executing the one or more applications selected by the user.

5. The method of claim 1 further comprises automatically closing one or more applications associated with the application identifier after execution of the one or more applications.

6. The method of claim 1 further comprising providing an option to a user to close
    the one or more applications associated with the application identifier after execution of the one or more applications.

7. The method of claim 1 further comprising automatically closing one or more applications associated with the application identifier after the USB device is disconnected from the computer.

8. The method of claim 1 further comprising providing an option to a user to close one or more applications associated with the application identifier after the USB device is disconnected from the computer.

9. The method of claim 1 further comprises registering the USB device in the systems library upon no match between the identifier and one or more device identifications.

10. A system comprising:
    a memory; and
    a processing device coupled to the memory to:
        retrieve an identifier of a Universal Serial Bus (USB) device connected to a computer system,
        match the identifier with a device identification stored in a systems library of the computer system, wherein the systems library comprises an application identifier corresponding to the device identification and an attribute corresponding to the application identifier, and
        execute instructions associated with the attribute corresponding to the application identifier associated with the device identification matched to the identifier.

11. The system of claim 10, wherein the instructions comprise automatically executing one or more applications associated with the application identifier upon connection of the USB device to the computer.

12. The system of claim 10 wherein the instructions comprise prompting a user to select one or more applications associated with the application identifier for execution.

13. The system of claim 10, the processing device automatically closes one or more applications associated with the application identifier after execution of the one or more applications.

14. The system of claim 10 the processing device provides an option to a user to close the one or more applications associated with the application identifier after execution of the one or more applications.

15. The system of claim 10 the processing device automatically closes one or more applications associated with the application identifier after the USB device is disconnected from the computer.

16. The system of claim 10 the processing device provides an option to a user to close one or more applications associated with the application identifier after the USB device is disconnected from the computer.

17. The system of claim 10 the processing device registers the USB device in the systems library upon no match between the identifier and one or more device identifications.

18. A non-transitory computer readable storage medium having instructions stored thereon that, when executed by a processing device, cause the processing device to perform operations comprising:
    retrieving an identifier of a Universal Serial Bus (USB) device connected to a computer system;
    matching the identifier with a device identification stored in a systems library of the computer system, wherein the systems library comprises an application identifier corresponding to the device identification and an attribute corresponding to the application identifier; and
    executing, by the processing device, instructions associated with the attribute corresponding to the application identifier associated with the device identification matched to the identifier.

19. The non-transitory computer readable storage medium of claim 18, wherein the instructions comprise automatically executing one or more applications associated with the application identifier upon connection of the USB device to the computer.

20. The non-transitory computer readable storage medium of claim 18 wherein the instructions comprise prompting a user to select one or more applications associated with the application identifier for execution.

* * * * *